United States Patent
Richter et al.

(10) Patent No.: US 10,854,347 B2
(45) Date of Patent: Dec. 1, 2020

(54) SYSTEM AND METHOD FOR HARVESTING OF ACTIVATED IRRADIATION TARGETS FROM A NUCLEAR REACTOR AND RADIONUCLIDE GENERATION SYSTEM

(71) Applicant: Framatome GmbH, Erlangen (DE)

(72) Inventors: Thomas Fabian Richter, Marloffstein (DE); Alexander Sykora, Nuremberg (DE); Wilfried Kannwischer, Hirschaid (DE); Leila Jaafar, Erlangen (DE)

(73) Assignee: FRAMATOME GMBH

( * ) Notice: Subject to any disclaimer, the term of this patent is extended or adjusted under 35 U.S.C. 154(b) by 413 days.

(21) Appl. No.: 15/746,040

(22) PCT Filed: Jul. 21, 2015

(86) PCT No.: PCT/EP2015/066670
§ 371 (c)(1),
(2) Date: Jan. 19, 2018

(87) PCT Pub. No.: WO2017/012655
PCT Pub. Date: Jan. 26, 2017

(65) Prior Publication Data
US 2018/0211733 A1    Jul. 26, 2018

(51) Int. Cl.
*G21G 1/02* (2006.01)
*G21C 23/00* (2006.01)

(52) U.S. Cl.
CPC ............. *G21G 1/02* (2013.01); *G21C 23/00* (2013.01)

(58) Field of Classification Search
CPC ........... G21G 1/005; G21G 1/02; G21C 23/00
See application file for complete search history.

(56) References Cited

U.S. PATENT DOCUMENTS 3,263,081 A    7/1966   Wiesemann et al.
3,284,306 A  * 11/1966   Balla ................. G21C 1/303
                                                        376/344

(Continued)

FOREIGN PATENT DOCUMENTS

EP    2093773 A2    8/2009
GB    1324380 A     7/1973

OTHER PUBLICATIONS

PCT International Search Report and Written Opinion dated Mar. 15, 2016 from corresponding Application No. PCT/EP2015/066670, 10 pages.

*Primary Examiner* — Sharon M Davis
(74) *Attorney, Agent, or Firm* — Dilworth IP, LLC (57) ABSTRACT

A method for harvesting activated irradiation targets from an instrumentation tube system of a nuclear reactor comprises: Coupling the instrumentation tube system to a discharge tube having an apex, exit port and lock element between the apex and exit port; Passing the activated irradiation targets from the instrumentation tube system into the discharge tube and blocking movement of said targets out of the discharge tube using the lock element; Separating a predefined quantity of the targets from another quantity of targets in the discharge tube by passing the predefined quantity of targets over the apex, retaining the remainder in the discharge tube by means of the apex; Coupling the exit port to a storage container and releasing the lock element to pass via gravity the predefined quantity of targets into the storage container. Systems for generating radionuclides and harvesting activated irradiation targets adapted to the above method are also provided.

18 Claims, 4 Drawing Sheets

(56) References Cited

U.S. PATENT DOCUMENTS

| | | | |
|---|---|---|---|
| 2009/0213977 A1* | 8/2009 | Russell, II | G21B 1/00 |
| | | | 376/170 |
| 2013/0170927 A1 | 7/2013 | Dayal et al. | |
| 2013/0177118 A1 | 7/2013 | Heinold et al. | |
| 2013/0315361 A1 | 11/2013 | Berger et al. | |
| 2016/0012928 A1* | 1/2016 | Guler | G21C 23/00 |
| | | | 376/156 |

* cited by examiner

SYSTEM AND METHOD FOR HARVESTING OF ACTIVATED IRRADIATION TARGETS FROM A NUCLEAR REACTOR AND RADIONUCLIDE GENERATION SYSTEM

FIELD OF THE INVENTION

The present invention is directed to a system and method for harvesting of activated irradiation targets from a nuclear reactor, and a radionuclide generation system configured to produce radionuclides from irradiation targets inserted into an instrumentation finger in a commercial nuclear reactor core.

TECHNICAL BACKGROUND OF THE INVENTION

Radionuclides are used in various fields of technology and science, as well as for medical purposes. Usually, radionuclides are produced in research reactors or cyclotrons. Since the number of facilities for commercial production of radionuclides is limited and expected to decrease, it is desired to provide alternative production sites.

EP 2 093 773 A2 suggests that existing instrumentation tube systems conventionally used for housing neutron detectors may be used to generate radionuclides during normal operation of a commercial nuclear reactor. In particular, spherical irradiation targets are linearly pushed into and removed from instrumentation fingers extending into the reactor core. Based on the axial neutron flux profile of the reactor core, the optimum position and exposure time of the targets in the reactor core are determined. A driving gear system is used for moving and holding the irradiation targets in the instrumentation tube system.

US 2013/0177118 A1 discloses a system that allows irradiation targets to be irradiated in a nuclear reactor and deposited in a harvestable configuration without direct human interaction or discontinuation of power-producing activities. The system includes accessible end-points that store desired produced isotopes for handling and/or shipping. A cask tube is configured for use with multiple storage casks based on target properties. One or more stops may be inserted into the cask tube at desired positions to separate out a certain population of irradiation targets. A specific embodiment shows two stops provided in a cask tube at a predetermined distance that corresponds to a length of leader spheres. The leader spheres may then be emptied out of the cask tube via gravity or pneumatic force into a separate cask or other facility.

US 2013/0170927 A1 discloses apparatuses and methods for producing radioisotopes in instrumentation tubes of operating commercial nuclear reactors. Irradiation targets are inserted and removed from instrumentation tubes during operation and converted to radioisotopes. A harvesting station is provided outside of an access-restricted area to permit access for refilling or harvesting the targets during plant operation. A harvesting cask and/or cask tube may be equipped with a target counter or activity detector that counts or measures properties of irradiation targets moving into the harvesting cask.

US 2013/0315361 A1 relates to apparatuses and methods for producing radioisotopes in multiple instrumentation tubes of operating commercial nuclear reactors. Irradiation targets are inserted and removed from multiple instrumentation tubes and converted to radioisotopes during operation of the nuclear reactor. Positioning irradiation targets are used to properly position other irradiation targets at appropriate positions within or near the nuclear core. The positioning targets may be sorted out from the harvesting cask due to their markings or physical properties, or other discriminators may selectively divert the positioning targets to alternate termination points.

Conventional aero-ball measuring systems are known in the art and disclosed, for example, in GB 1 324 380 A and U.S. Pat. No. 3,263,081 A.

Due to the high activity of the activated irradiation targets retrieved from the instrumentation tube system, and since space within the reactor containment is limited, the activated targets are difficult to handle. In particular, the activated targets including the radionuclides must be filled into and stored in containers provided with heavy radiation shielding. The chambers for the Traversing Incore Probe (TIP) system and/or aero-ball measuring system do not have any structures for packaging and transporting those heavy containers. Provision of additional water locks in the reactor containment for handling of the activated targets and shielded containers would also be too expensive.

SUMMARY OF THE INVENTION

It is an object of the invention to provide a harvesting system for activated irradiation targets from an instrumentation tube system of a commercial nuclear reactor, such as the instrumentation finger of an aero-ball measuring system or a Traversing Incore Probe (TIP) system extending into the core of a nuclear reactor, which allows for an easy handling of shielded storage containers and harvesting of the activated targets during reactor operation, and which can be installed subsequently into existing structures within accessible areas of the reactor containment.

The above objects are solved by a radionuclide harvesting system according to claim 1. Advantageous and expedient embodiments of the invention are indicated in the dependent claims which can be combined with each other independently.

According to a first aspect, the invention provides an irradiation target harvesting system comprising at least one storage container for receiving activated irradiation targets from an instrumentation tube system of a nuclear reactor;

a discharge tube having an exit port configured to be coupled to the storage container; and a lock element provided in the discharge tube for blocking movement of the activated irradiation targets into the storage container;

wherein the discharge tube comprises a first discharge tube section, a second discharge tube section and an apex formed at a conjunction of the first and second discharge tube section, wherein the first and second discharge tube sections are directed downwardly from the apex, wherein the exit port is arranged at an end of the first discharge tube section and wherein the second discharge tube section is coupled to the instrumentation tube system.

According to a further aspect, the invention provides a radionuclide generation system comprising:

an instrumentation tube system of a nuclear reactor including at least one instrumentation finger extending into a core of the nuclear reactor wherein the instrumentation tube system is configured to permit insertion and removal of irradiation targets into the instrumentation finger;

a target drive system configured to insert the irradiation targets into the instrumentation finger in a predetermined linear order and to remove the irradiation targets from the instrumentation finger;

a core monitoring system and an instrumentation and control unit linked to each other and configured to calculate an optimum axial irradiation position and time for the irradiation targets based on an actual state of the nuclear reactor as provided by the core monitoring system; and a target harvesting system comprising at least one storage container for receiving the activated irradiation targets from the instrumentation tube system of the nuclear reactor, a discharge tube having an exit port configured to be coupled to the storage container; and a lock element provided in the discharge tube for blocking movement of the activated irradiation targets into the storage container; wherein the discharge tube comprises a first discharge tube section, a second discharge tube section and an apex formed at a conjunction of the first and second discharge tube section, wherein the first and second discharge tube section are directed downwardly from the apex, wherein the exit port is arranged at an end of the first discharge tube section and wherein the second discharge tube section is coupled to the instrumentation tube system.

In another aspect, the invention is a method for harvesting activated irradiation targets from an instrumentation tube system of a nuclear reactor, wherein the method comprises the steps of:

Coupling the instrumentation tube system to a discharge tube having an apex, an exit port and a lock element between the apex and the exit port;

Passing the activated irradiation targets from the instrumentation tube system into the discharge tube and blocking movement of the activated irradiation target out of the exit tube by means of the lock element;

Separating a predefined quantity of the activated irradiated targets from another quantity of the activated irradiated targets in the discharge tube;

Coupling the exit port to a storage container and releasing the lock element to pass the predefined quantity of the activated irradiated targets under action of gravity into the storage container;

wherein said separating step comprises passing the predefined quantity of the activated irradiation targets over the apex and keeping the other quantity of activated irradiation targets in the discharge tube or the instrumentation tube system by means of the apex.

According to the invention, the activated irradiation targets including the radionuclides are removed from the instrumentation finger and passed into the discharge tube, wherein a predefined quantity of the irradiated targets is separated from the remaining irradiated targets in the discharge tube, and the predefined quantity of the irradiated targets is released from the discharge tube into a shielded storage container under action of gravity. Since only a predefined quantity of the activated targets having a predetermined lower activity is harvested from the system and stored in the shielded container, much smaller containers can be used which are easy to be transported either manually or by means of existing handling structures within the reactor containment.

The discharge tube of the target harvesting system is configured to receive the activated irradiation targets from the instrumentation tube system of the nuclear reactor. The discharge tube comprises an apex dividing the discharge tube into a first section proximate an exit port and a second section coupled to the instrumentation tube system. A lock element is provided in the first discharge tube section near the exit port to block movement of the activated irradiation targets out of the discharge tube.

Activated irradiation targets passing from the instrumentation tube system into the discharge tube are held in the tube by the lock element. One of a number of shielded storage containers is coupled to the exit port. When the lock element is opened, the predefined quantity of the activated targets leaves the discharge tube driven by gravity, and is collected in the shielded storage container. The quantity of activated targets leaving the exit tube is determined by the length of the target column in the first discharge tube section. Thereafter, the lock element can be closed and the activated targets remaining in the discharge tube can be driven back into the instrumentation tube system using pressurized air or any other suitable gas such as nitrogen. The shielded storage container can be closed and transported out of the reactor containment.

The invention provides a simple and cost effective system for portioning and harvesting of activated irradiation targets. The targets can be released from the discharge tube under the action of gravity using a simple lock element, rather than using pressurized air or gas. Thus, generating of aerosols is minimized during release of the targets. Portioning of the targets is possible by defining the length of the first discharge tube section between the lock element and the apex which corresponds to the length of the target column and thus the amount of the targets released from the first discharge tube section. No sorters or target counters are necessary. If desired, the activated targets retained in the second discharge tube section can be driven back into a holding position in the instrumentation tube system, or even back into the instrumentation finger. This will further minimize an operator's exposure to radioactivity.

According to a preferred embodiment of the irradiation target harvesting system, the exit port comprises a valve element for pressure-tight sealing the discharge tube. Sealing the exit port facilitates a safe removal of the storage container filled with activated irradiation targets. No aerosols are released into the containment during target transport inside the instrumentation tubes.

Preferably, the exit port is located within an accessible area of the reactor containment.

Preferably, the discharge tube comprises a T-junction located between the lock element and the exit port, wherein the T-junction is configured for supplying and discharging pressurized air into and out of the discharge tube. Providing the T-junction for air supply is an easy cost effective measure to control movement of the activated irradiation targets in the discharge tube. Still preferably, the T-junction comprises a three-way valve.

More preferably, the first discharge tube section, the second discharge tube section and the apex are shaped in the form of an inverse U. The pre-defined quantity of the activated irradiation targets to be separated from the other targets is then defined by the length of a leg of the inverse U, between the lock element and the apex, corresponding to the length of the target column in this leg. The inverse U-shape provides for a reliable portioning of the activated irradiation targets. In addition, release of the target column from the leg of the inverse U is possible under the action of gravity by simply opening the lock element. Thus damage to the activated irradiation targets can be avoided.

According to a further embodiment, the lock element is at a first level, wherein the second discharge tube section has a base point opposite to the apex and the base point is at a second level, wherein the first level is higher than the second level. In other words, a height of the target column in the first discharge tube section corresponding to a distance between the lock element and the apex is lower than a height of the target column in the second discharge tube section or distance between the base point of the second discharge tube section and the apex. Due to the greater height of the target column in the second discharge tube section, the apex reliably retains the other quantity of the targets in the second discharge tube section or instrumentation tube system without any further mechanical means.

In a further preferred embodiment, the lock element is a magnetically or mechanically operated restriction element, preferably a pin. These elements are available as standard components at low costs.

The irradiation target harvesting system may further comprise one or more magnets arranged at the first discharge tube section between the apex and the lock element. Preferably, the magnets can be used to select and separate activated irradiation targets from dummy targets in the discharge tube. The dummy targets are made from an inert material and may be used to achieve a proper axial positioning of the irradiation targets in the nuclear reactor core. More preferably, one of the irradiation targets and the dummy targets is ferromagnetic whereas the other one of the irradiation targets and dummy targets is non-magnetic or paramagnetic.

Preferably, the one or more magnets are selected from a permanent magnet and a solenoid. Still more preferably, the one or more magnets are movable along the first discharge tube section so as to selectively expose ferromagnetic targets to a magnetic field and retain the ferromagnetic targets in the discharge tube.

The method for harvesting activated irradiation targets from an instrumentation tube system of a nuclear reactor preferably comprises the step of transferring the other quantity of the activated irradiation targets from the second discharge tube section into a holding position in the instrumentation tube system or back into the instrumentation finger prior to removing the storage container from the exit port. The holding position may be remote from the discharge tube in a shielded or access-restricted area of the reactor. This embodiment will further minimize any exposure to radiation of an operator.

More preferably, the steps of the harvesting method are repeated until all activated irradiation targets are removed from the system, and portions of the activated irradiation targets are stored in a number of storage containers.

The invention provides a system and method for harvesting of activated irradiation targets from an instrumentation tube system of a commercial nuclear reactor wherein the total amount of activity transferred into a storage container is reduced by portioning the activated irradiation targets. Therefore, smaller storage containers with less shielding can be used which allows for an easy handling of the containers within the reactor containment. The harvesting system makes use of simple mechanical components and can therefore be installed subsequently into existing reactor structures such as an aero-ball measuring system.

In a preferred embodiment, dummy targets may be used for positioning the irradiation targets in the instrumentation finger, and the activated irradiation targets are separated from the dummy targets by means of their different magnetic properties. One or more magnets positioned at the first discharge tube section are used for retaining one of the dummy targets or irradiation targets within the instrumentation tube system and deliver the other one of the dummy targets or the irradiation targets to a storage container or intermediate tank, respectively.

Separating the targets by means of different magnetic properties allows for a fast remote processing of the activated irradiation targets and may also avoid the use of additional mechanical systems such as counters, indexers and gateways to determine the exact position of the dummy targets and irradiation targets.

BRIEF DESCRIPTION OF THE DRAWINGS

Further features and advantages of the invention will become more apparent from the following description of preferred embodiments and from the accompanying drawings wherein like elements are represented by like numerals. The preferred embodiments are given by way of illustration only and are not intended to limit the scope of the invention which is apparent from the attached claims.

In the drawings.

DETAILED DESCRIPTION OF THE INVENTION

The invention contemplates that a commercial nuclear reactor can be used for producing radionuclides. In particular, conventional aero-ball measuring systems or other instrumentation tube systems of the commercial reactor can be modified and/or supplemented to enable an effective and efficient production of radionuclides.

Some of the instrumentation tubes for example of a commercial aero-ball measuring system or Traversing Incore Probe (TIP) system are used to guide the irradiation targets into the reactor core and to lead the activated irradiation targets out of the reactor core. The activation of the targets is optimized by positioning the irradiation targets in predetermined areas of the reactor core having a neutron flux sufficient for converting the parent material in the irradiation targets completely into the desired radionuclide.

The proper positioning of the irradiation targets may be achieved by means of dummy targets made of an inert material and sequencing the dummy targets and the irradiation targets in the instrumentation tube system so as to form a column of the targets in the instrumentation finger wherein the irradiation targets are at a pre-calculated optimum axial position in the reactor core and the other positions are occupied by the inert dummy targets or remain empty.

Figure 1:
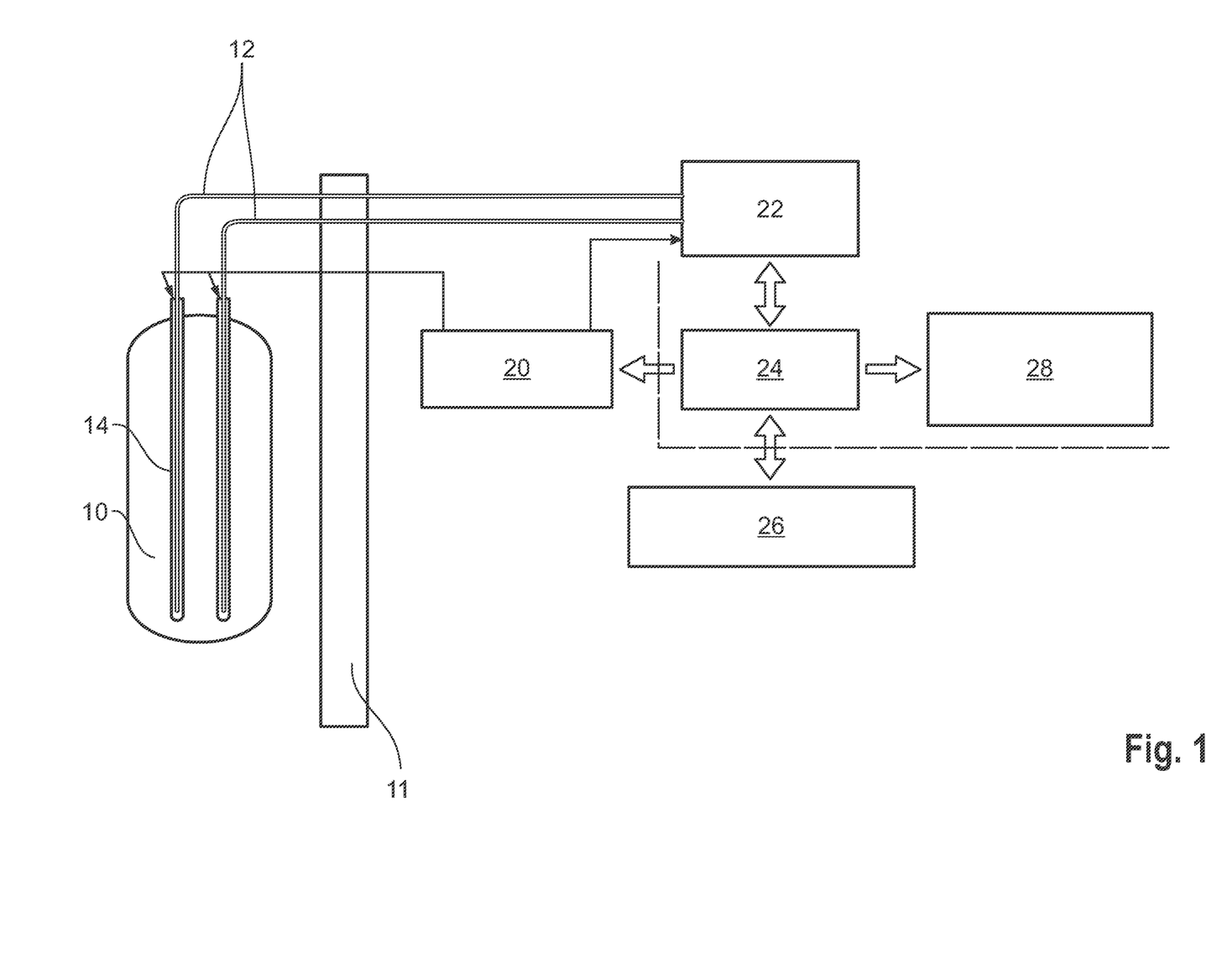
FIG. 1 shows a schematic sketch of a radionuclide generation system setup according to the invention.

FIG. 1 illustrates the basic setup of a radionuclide generation system within a commercial nuclear power plant. As opposed to a research reactor, the purpose of a commercial nuclear reactor is the production of electrical power. Commercial nuclear reactors typically have a power rating of 100+ Megawatt electric.

The basis of the radionuclide generation system described in the example embodiments is derived from a conventional aero-ball measuring system used to measure the neutron flux density in the core of the nuclear reactor. A plurality of aero-balls are arranged in a linear order thereby forming an aero-ball column. The aero-balls are substantially spherical or round probes but can have other forms such as ellipsoids or cylinders, as long as they are capable of moving through the conduits of the instrumentation tube system. The aero-ball measuring system includes a pneumatically operated drive system configured to insert the aero-balls into an instrumentation finger extending into and passing the core through its entire axial length, and to remove the aero-balls from the instrumentation finger after activation.

For easier reference, hereafter the radionuclide generation system based on a commercial aero-ball measuring system will be also referred to as MAS or Medical Aeroball System. The irradiation target harvesting system of the present invention can also be built as a stand-alone system that is fixed to an unmodified nuclear instrumentation tube of a regular aero-ball measuring system. The inventive target harvesting system is then configured to be movable and only temporarily attached to the instrumentation tube system during target discharge. Thus, no permanent modification of the aero-ball measuring system is required.

In the following, the major components of the MAS, which are provided in addition to those of the commercial aero-ball measurement system, or which are supplemented or modified, will be further described.

Referring to FIG. 1, a commercial nuclear reactor comprises an instrumentation tube system 12 including at least one instrumentation finger 14 passing through a core 10 of the nuclear reactor. The instrumentation tube system 12 is configured to permit insertion and removal of irradiation targets 16 and optionally dummy targets 18 (cf. FIG. 2) into the instrumentation finger 14.

The aero-ball measuring system of the commercial nuclear reactor is adapted to handle irradiation targets 16 having a round, cylindrical, elliptical or spherical shape and having a diameter corresponding to the clearance of the instrumentation finger of the aero-ball measuring system. Preferably, the diameter of the targets 16, 18 is in the range of between 1 to 3 mm, preferably about 1.7 mm.

Conduits of the instrumentation tube system 12 penetrate an access barrier 11 of the reactor and are coupled to one or more instrumentation fingers 14. Preferably, the instrumentation finger penetrates the pressure vessel cover of the nuclear reactor, with the instrumentation finger 14 extending from the top to the bottom over substantially the entire axial length of the reactor core 10. An end of the instrumentation finger 14 at the bottom of the reactor core 10 is closed and/or provided with a stop so that the irradiation targets 16 inserted into the instrumentation finger form a column wherein each target 16 is at a predefined axial position.

Preferably, one or more humidity sensors (not shown) may be provided in the instrumentation tube system 12 to detect any ingress of primary coolant (or any other liquid) into the MAS. It is understood that the instrumentation fingers 14 used for the MAS are in direct contact with the primary coolant surrounding fuel elements in the core of the nuclear reactor. The humidity sensors may be based on spark plugs which are modified for measuring electrical resistance.

More preferably, the instrumentation tube system 12 comprises further sensors (not shown) for monitoring the presence and runtime of the irradiation targets 16 and optionally the dummy targets 18 passing through the instrumentation tube system 12, in particular into and out of the instrumentation finger 14. These sensors are preferably arranged at the conduits penetrating the reactor core 10. The measuring principle may be based on the detection of a variation of the magnetic flux as the irradiation targets 16 and/or the dummy targets 18 pass by the sensors for measuring transport time and completeness.

Preferably, the sensors are used to monitor that all irradiation targets 16 have left the instrumentation finger 14 during the removal process while the targets pass the sensors. In addition, or as an alternative, activity sensors can be used for detecting the radiation of the irradiation targets 16 and/or the dummy targets 18.

According to a preferred embodiment, the commercial nuclear reactor is a pressurized water reactor. More preferably, the instrumentation tube system is derived from a conventional aero-ball measuring system of a pressurized water reactor (PWR) such as an EPR™ or Siemens™ PWR nuclear reactor.

The person skilled in the art will however recognize that the invention is not limited to use of an aero-ball measuring system of a PWR reactor. Rather, it is also possible to use the instrumentation tubes of the Traversing Incore Probe (TIP) system of a boiling water reactor (BWR), the view ports of a CANDU reactor and temperature measurement and/or neutron flux channels in a heavy water reactor.

As shown in FIG. 1, the instrumentation tube system 12 is connected to a target drive system 20 configured to insert the irradiation targets 16 and optionally dummy targets 18 into the instrumentation finger 14 in a predetermined linear order and to force the irradiation targets 16 and dummy targets 18 out of the instrumentation finger 14 thereby retaining the linear order of the targets.

Preferably, the target drive system 20 is pneumatically operated allowing for a fast processing of the irradiation targets 16 and optionally the dummy targets 18 using pressurized gas such as nitrogen or air.

More preferably, the target drive system 20 comprises one or more pneumatically operated valve batteries (not shown) for separate control of the insertion and transport of the irradiation targets 16 and optionally dummy targets 18 in the instrumentation tube system. Based on this separation of controls, the regular aero-ball measuring system for determining the neutron flux in the core and the radionuclide generation system can be operated independently from each other. The valve batteries of the target drive system 20 may be implemented as a further subsystem in addition to the valve batteries of the conventional aero-ball measuring system, or a separate target drive system is installed.

Moreover, the target drive system 20 may further comprise a gate system (not shown) including several mechanical and/or electro-mechanical devices configured to guide the irradiation targets 16 and optionally dummy targets 18 into selected conduits of the instrumentation tube system 12 and instrumentation fingers 14 in the reactor core 10.

The target drive system 20 cooperates with a target harvesting system 22 configured to receive activated irradiation targets 16 and optionally dummy targets 18 from the instrumentation tube system 12 and pass a pre-defined quantity of the activated irradiation targets into a shielded storage container. The target harvesting system will be described in greater detail below, with reference to FIG. 3.

The drive system 20 may also comprise a gate system (not shown) to guide the targets 16, 18 from the reactor core to the target harvesting system 22.

With further reference to FIG. 1, an instrumentation and control unit (ICU) 24 is connected to the target drive system 20 and the target harvesting system 22 as well as an online core monitoring system 26 for controlling activation of the irradiation targets 16. Preferably, the ICU 24 is also connected to a fault monitoring system 28 of the aero-ball measuring system for reporting any errors in the MAS. The fault monitoring system 28 may also be designed without connection to the existing aero-ball measuring system, but be connected directly to the main control room.

According to a preferred embodiment, the core monitoring system 26 and the instrumentation and control unit 24 are configured such that the activation process for converting the irradiation targets 16 to the desired radionuclide is optimized by considering the actual state of the reactor, especially the current neutron flux, fuel burn-up, reactor power and/or loading. Thus, an optimum axial irradiation position and irradiation time can be calculated for optimum results. It is however not important whether the actual calculation is performed in the ICU 24 or by the core monitoring system 26 of the aero-ball measuring system.

The ICU 24 is connected with the online core monitoring system 26 software via an interface. The software is configured to calculate the required irradiation time for the targets online according to the actual neutron flux. The MAS is operated by the ICU 24. Start/Stop signals for target activation are exchanged between both systems. The ICU 24 is further connected to the mechanical components of the MAS, including the sensors. The online core monitoring system 26 of the conventional aero-ball measuring system, such as the POWERTRAX/S™ core monitoring software system available from Areva™, is able to provide substantially all relevant input data for the calculation of optimum activation conditions necessary for an efficient generation of radionuclides.

Preferably, the information provided by the core monitoring system 26 to the instrumentation and control unit 24 includes at least one of the following: neutron flux (from ex- or in-core detectors), activation values from an existing aero-ball measuring system, burn-up, reactor power, loading, rod position(s), flow rate, inlet-temperature, pressure, and time synchronization. The more information about the reactor is considered as input data, the more accurate will be the results of the calculation of the optimum axial irradiation position and irradiation time. The before mentioned parameters may include real-time values and any derivatives, like developments over a pre-defined period of time.

The information obtained from the core monitoring system 26 may also be used in the ICU 24 to calculate other parameters such as the amount of irradiation targets 16 in a specific instrumentation finger 14 defining the actual length of the respective target column, and the positions of the individual irradiation targets 16 and optionally dummy targets 18 within the target column. Based on the results of the calculations, the ICU 24 and/or an operator will operate the mechanical MAS components.

In a preferred embodiment, the ICU 24 is configured such that operation of the valves of the target drive system 20 is at least partly automated to achieve a safe and reliable operation of the target drive system.

More preferably, the instrumentation and control unit 24 may be configured to automatically control the pressure in the instrumentation tube system 12, in particular after each insertion of irradiation targets 16 and/or dummy targets 18 by the target drive system 20.

Operation of the radionuclide generation system is preferably monitored and controlled at an operator station via a processing unit. The processing unit can be installed in a separate control cabinet in a control cabinet room (not shown). The processing unit is equipped with a display and, inter alia, allows for controlling specific parameters of the valve batteries of the target drive system 20 and target harvesting system 22.

At the operator station the condition of the irradiation targets 16 during irradiation and the remaining irradiation time can be monitored. When the irradiation time of a set of targets 16 in an instrumentation finger 14 reaches the calculated time, a message prompts the operator to start the removal and harvesting process with respect to this instrumentation finger 14. The operation of the various valves of the target drive system 20 is partly automated so that repeated actions are performed safely and reliably.

After each insertion of irradiation targets 16 and dummy targets 18 into the instrumentation tube system 12, the pressure in the tube system is checked and regulated in a fully automated manner. The ICU 24 also collects further digital signals representative of certain system conditions. Especially, the signals of the humidity sensors allow for a leakage monitoring such as ingress of primary coolant into the instrumentation tube system 12.

A load cabinet of the aero-ball measuring system may also provide the electric power for the components of the radionuclide generation system, including the valve batteries and the processing unit in the control cabinet. An additional power inverter having appropriate fuses may be installed in the load cabinet. It is also possible to use an additional 24 volt supply provided in the control cabinet room.

Figure 2:
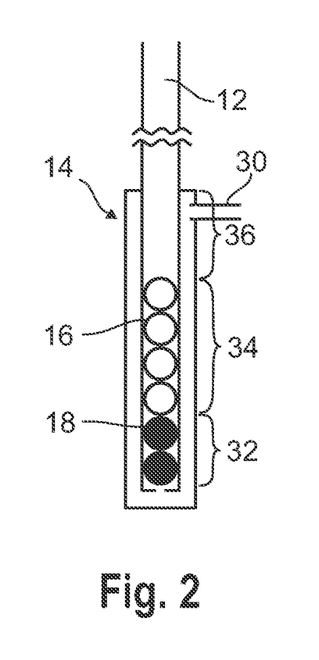
FIG. 2 shows an instrumentation finger filled partly with irradiation targets and partly with dummy targets.

With reference to FIG. 2, an instrumentation finger 14 or other aero-ball conduit of the instrumentation tube system 12 penetrates a cover of the reactor pressure vessel. The instrumentation finger 14 extends from the top to the bottom over substantially the entire axial length of the reactor core 10. Irradiation targets 16 and optionally dummy targets 18 are inserted into the instrumentation finger 14 in a linear order to form a target column wherein each target 16, 18 is at a predefined axial position. The instrumentation finger 14 comprises a gas inlet port 30 at a top of the finger which is coupled to the target drive system 20.

Alternatively, it is also possible to insert the targets into the instrumentation finger 14 from a drywell at the bottom of the reactor core 10, for example if the TIP system of a boiling water reactor is used as the instrumentation tube system 12. In this case, additional means for retaining the irradiation targets 16 and dummy targets 18 in the instrumentation finger 14 are provided.

The irradiation targets 16 are made of non-fissile material and comprise a suitable precursor material for generating radionuclides which are to be used for medical and/or other purposes. More preferably, the irradiation targets consist of the precursor material which converts to a desired radionuclide upon activating by exposure to neutron flux present in the core of an operating commercial nuclear reactor. Useful precursor materials are Mo-98, Yb-176 and Lu-176 which are converted to Mo-99 and Lu-177, respectively. It is understood, however, that the invention is not limited to the use of a specific precursor material.

The dummy targets 18 are made of an inert material which is not substantially activated under the conditions in the core 10 of an operating nuclear reactor. Preferably, the dummy targets can be made of inexpensive inert materials and can be re-used after a short decay time so that the amount of radioactive waste is further reduced.

For use in a conventional aero-ball measuring system, the irradiation targets 16 and the dummy targets 18 have a round shape, preferably a spherical or cylindrical shape, so that the targets may slide smoothly through and can be easily guided in the instrumentation tube system 12 of the aero-ball measuring system by pressurized gas, such as air or nitrogen, and/or under the action of gravity.

According to a preferred embodiment, the dummy targets 18 and the irradiation targets 16 have different magnetic properties. Preferably, either the dummy targets 18 or the irradiation targets 16 are magnetically attractable. More preferably, one of the irradiation targets 16 and the dummy targets 18 is ferromagnetic whereas the other one of the irradiation targets 16 and dummy targets 18 is non-magnetic or paramagnetic. Still more preferably, the dummy targets 18 are made from a ferromagnetic material such as iron or iron alloys, including ferritic stainless steel, or ferrite.

With the aid of the online core monitoring system 26 it is possible to determine sections 32, 36 of the instrumentation finger 14 in which the neutron flux is too low for producing radionuclides, and sections 34 where the neutron flux is above the required irradiation target demand and thus sufficient for producing the desired radionuclides.

In order to eliminate any waste of expensive irradiation targets 16, dummy targets 18 are provided and positioned preferably in the lower end section 32 of the irradiation finger 14 having a too low neutron flux density for radionuclide generation.

According to the embodiment shown in FIG. 2, the irradiation targets 16 are positioned above and are held in place by the dummy targets 18 in a center section 34 of the irradiation finger 14 where the neutron flux is sufficient to completely convert the irradiation targets into the desired radionuclides, as determined by the ICU 24 and/or the online core monitoring system 26.

In accordance with a preferred embodiment of the invention, an upper section 36 of the instrumentation finger 14 is kept empty.

In a commercial pressurized water reactor, the center section 34 of the instrumentation finger useful for radionuclide generation generally extends over about 3-4 meters, and the end sections 32, 36 extend over 0.5 to 1 meter. These values may vary according to the reactor type and the actual operation status of the reactor, and will be different for boiling water reactors, heavy water reactors and CANDU reactors, respectively.

In another embodiment (not shown), one or more of the irradiation targets 16 in the instrumentation finger 14 may be separated from each other by one or more dummy targets 18 thereby defining irradiation target subsections. The irradiation targets in the irradiation target subsections preferably have the same or different material properties. More preferably, the irradiation targets in adjacent subsections differ with respect to the precursor material used for radionuclide generation. This embodiment will enable the production of different radionuclides in a one-step operation.

The optimum positioning of the irradiation targets 16 by means of inexpensive dummy targets 18 in an instrumentation tube system 12 of a commercial nuclear reactor provides an effective and economical production of radionuclides during reactor operation, and also avoids production of nuclear waste due to incomplete target activation.

Figure 3:
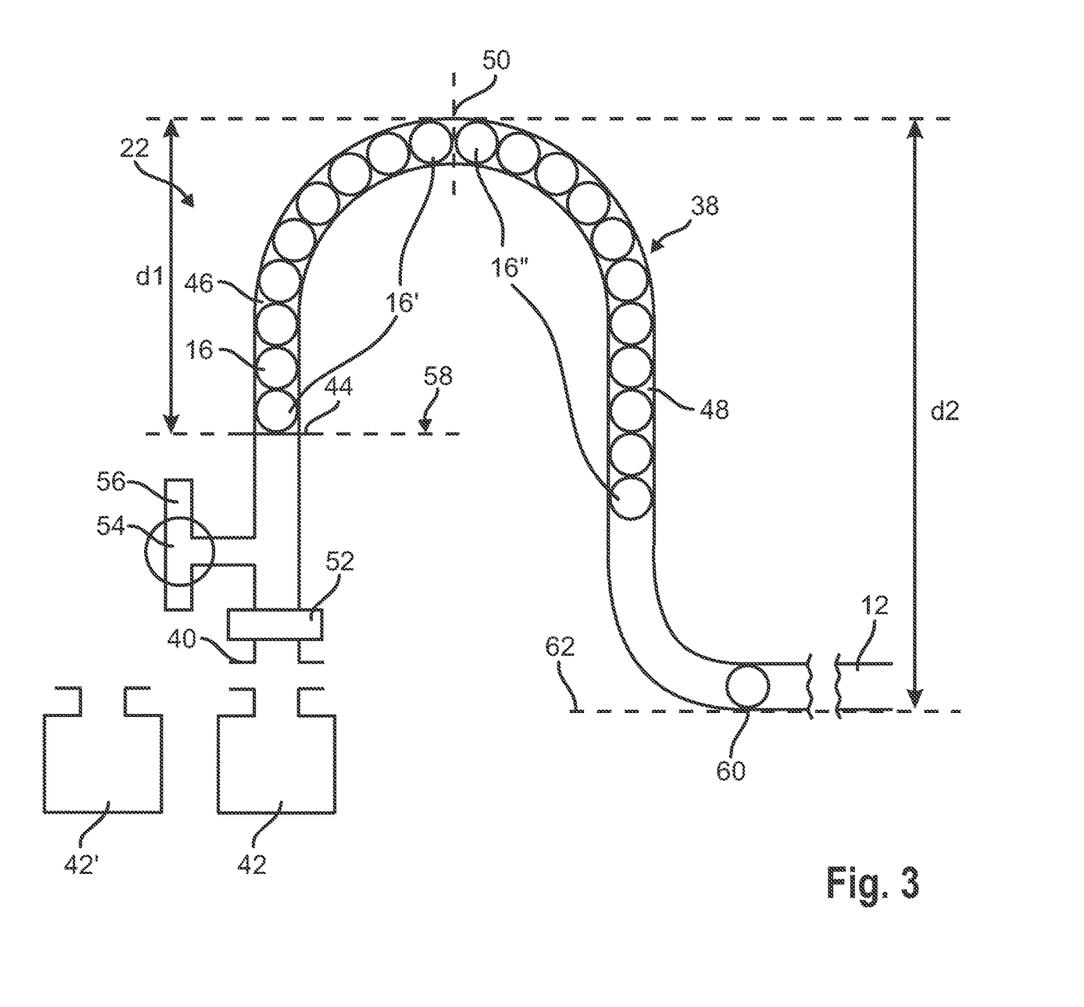
FIG. 3 shows a schematic sketch of a target harvesting system and discharge tube of the present invention.

The irradiation target harvesting system 22 of the present invention is schematically shown in FIG. 3.

A discharge tube 38 is connected to the instrumentation finger 14 through aero-ball conduits of the instrumentation tube system 12. The discharge tube 38 is configured to receive the irradiation targets 16 driven out of the instrumentation finger after activation is completed. The linear order of the irradiation targets 16 and/or the dummy targets 18 is retained in the discharge tube. Preferably, the discharge tube 38 is located outside the reactor core 10, but within accessible areas inside the reactor containment.

The discharge tube 38 has an exit port 40 which can be coupled to at least one storage container 42, 42' for receiving the activated irradiation targets 16 from the instrumentation finger 14. The storage container 42, 42' preferably has a shielding to minimize an operator's exposure to radiation from the activated irradiation targets 16.

A lock element 44 is provided in the discharge tube 38 for blocking movement of the activated irradiation targets to the storage container. The lock element 44 can be a magnetically or mechanically operated restriction element, preferably a pin crossing the discharge tube 38.

Referring to FIG. 3, the discharge tube 38 comprises a first discharge tube section 46, a second discharge tube section 48 and an apex 50 formed at a conjunction of the first and second discharge tube section 46, 48. The apex 50 is the highest point of the discharge tube 38. The first and second discharge tube sections 46, 48 are directed downwardly from the apex 50. The exit port 40 is arranged at a free end of the first discharge tube section 46, opposed to the apex, and the second discharge tube section 48 is coupled to the instrumentation tube system 12.

The exit port 40 comprises a valve element 52 for pressure-tight sealing the discharge tube. A T-junction 54 is located between the lock element 44 and the exit port 40, wherein the T-junction 54 has a gas inlet port 56 for supplying pressurized gas into the discharge tube 38, and also a gas outlet for discharging gas out of the system. Preferably, the T-junction is configured as a three-way valve. The pressurized gas can be supplied from the target drive system 20, or from an external gas bottle, in particular when the harvesting system is operated as a stand-alone system with no modification of the regular aero-ball measurement system.

In the embodiment shown in FIG. 3, the first discharge tube section 46, the second discharge tube section 48 and the apex 50 are shaped in the form of an inverse U. Other profiles of the discharge tube 38 are possible as long as the apex 50 formed between the first and second discharge tube section 46, 48 has a radius which is sufficiently small to effectively separate the target columns in the first and second tube sections 46, 48 from each other.

Moreover, as shown in FIG. 3, the lock element 44 is at a first level 58, and the second discharge tube section 48 has a base point 60 opposite to the apex at a second level 62. The first level 58 is higher than the second level 62. Accordingly a distance $d_1$ between the lock element 44 and the apex 50 corresponding to a height of the target column in the first discharge tube section 46 is lower than the distance $d_2$ between the base point 60 of the second discharge tube section 48 and the apex 50 corresponding to a height of the target column in the second discharge tube section 48. The targets in the second discharge tube section 48 may therefore have a higher mass than the total of the target column in the first discharge tube section 46. The height difference assists the effect of the apex 50 and facilitates separation of the targets without using any further mechanical means.

The operation of the of the irradiation target harvesting system of the invention is now described in greater detail below.

Irradiation targets 16 activated in the instrumentation finger 14 for a period of time sufficient to convert the targets into the desired radionuclide are driven out of the instrumentation finger 14 into the instrumentation tube system 12 using pressurized gas such as air or nitrogen supplied from the target drive system 20. The discharge tube 38 is coupled to conduits of the instrumentation tube system 12 for receiving the irradiation targets 16. A gate system such as a three-way valve can be used to guide the irradiation targets 16 into the discharge tube 38 of the target harvesting system 22. The linear order of the irradiation targets 16 in the instrumentation finger 14 is preserved in the discharge tube 38.

At this time, access to the exit port 40 of the discharge tube 38 is blocked by the lock element 44 providing a stop for the activated irradiation targets 16 and preventing the targets 16 from leaving the discharge tube 38.

The activated irradiation targets 16 entering the discharge tube 38 are passed over the apex 50 formed at a conjunction between the first and second discharge tube section 46, 48. A pre-defined quantity (16') of the activated irradiation targets 16 is located proximate to the exit port 40 in the first discharge tube section 46. The quantity (16') of the irradiation targets 16 in the first discharge tube section 46 directly corresponds to the length of the first discharge tube section 46 between the lock element 44 and the apex 50. The apex 50 is located at the highest point of the target column in the discharge tube 38.

The valves of the drive system 20 are then closed and the pressure in the instrumentation tube system 12 and the discharge tube 38 is relieved.

The exit port 40 of the discharge tube is coupled to a shielded storage container 42, and the lock element 44 is opened so as to release the pre-defined quantity (16') of the activated irradiated targets 16 located on one side of the apex 50 in the first discharge tube section 46 and pass the targets 16 into the storage container 42 under action of gravity. The other quantity (16") of activated irradiation targets 16 located on the other side of the apex 50 in the second discharge tube section 48 is retained in the discharge tube 38, or may flow back into the instrumentation tube system 12, also under action of gravity.

The valve element 52 at the exit port 40 is closed for providing a pressure-tight sealing of the exit port 40 and the discharge tube 38, and the shielded storage container 42 is then removed either manually or by means of an automated handling device.

In a preferred embodiment, the quantity (16") of the activated irradiation targets 16 kept in the second discharge tube section 48 by means of the apex 50 is actively transferred from the discharge tube 38 into a holding position (not shown) in the instrumentation tube system 12 prior to removing the storage container 42 from the exit port 40. The holding position may be located within an access-restricted area of the reactor containment.

After the portion or quantity (16') of the activated irradiation targets 16 in the first discharge tube section 46 is transferred into the storage container 42, the valve element 52 at the exit port 40 is closed and pressurized gas from the target drive system 20 is blown into the gas inlet port 56 at the T-junction 54 near the exit port 40. The pressurized gas forces the other quantity (16") of the activated irradiation targets 16 out of the second discharge tube section 48 back into the holding position in the instrumentation tube system 12 or into the instrumentation finger 14. The valves of the target drive system 20 are then closed and the flow of pressurized air is stopped. The storage container 42 is removed from the exit port 40 and transported to a packaging facility or shipped to the desired application site. Since the discharge tube 38 is completely free of activated irradiation targets 16 the radiation exposure to operating personnel is further minimized.

The above process steps can then be repeated for portioning and harvesting a further quantity of activated irradiation targets 16 until all of the activated irradiation targets 16 have been removed from the instrumentation tube system 12. The system is then ready for starting a new radionuclide generation cycle.

According to the invention, a portion of the activated irradiation targets 16 in the first discharge tube section 46 is reliably and reproducibly separated from the other activated irradiation targets 16 which are kept in the discharge tube 38 simply by action of gravity without using additional mechanical elements and/or target counters. Since the length of the target column in the first discharge tube section 46, between the lock element 44 and the apex 50 also limits the amount of the targets and thus the total activity harvested in the storage container 42, less shielding of the containers will be necessary, and smaller containers can be used which require less space and are easier to handle. The simpler set-up of the target harvesting system 42 facilitates integration into existing structures within the reactor confinement.

Figure 4:
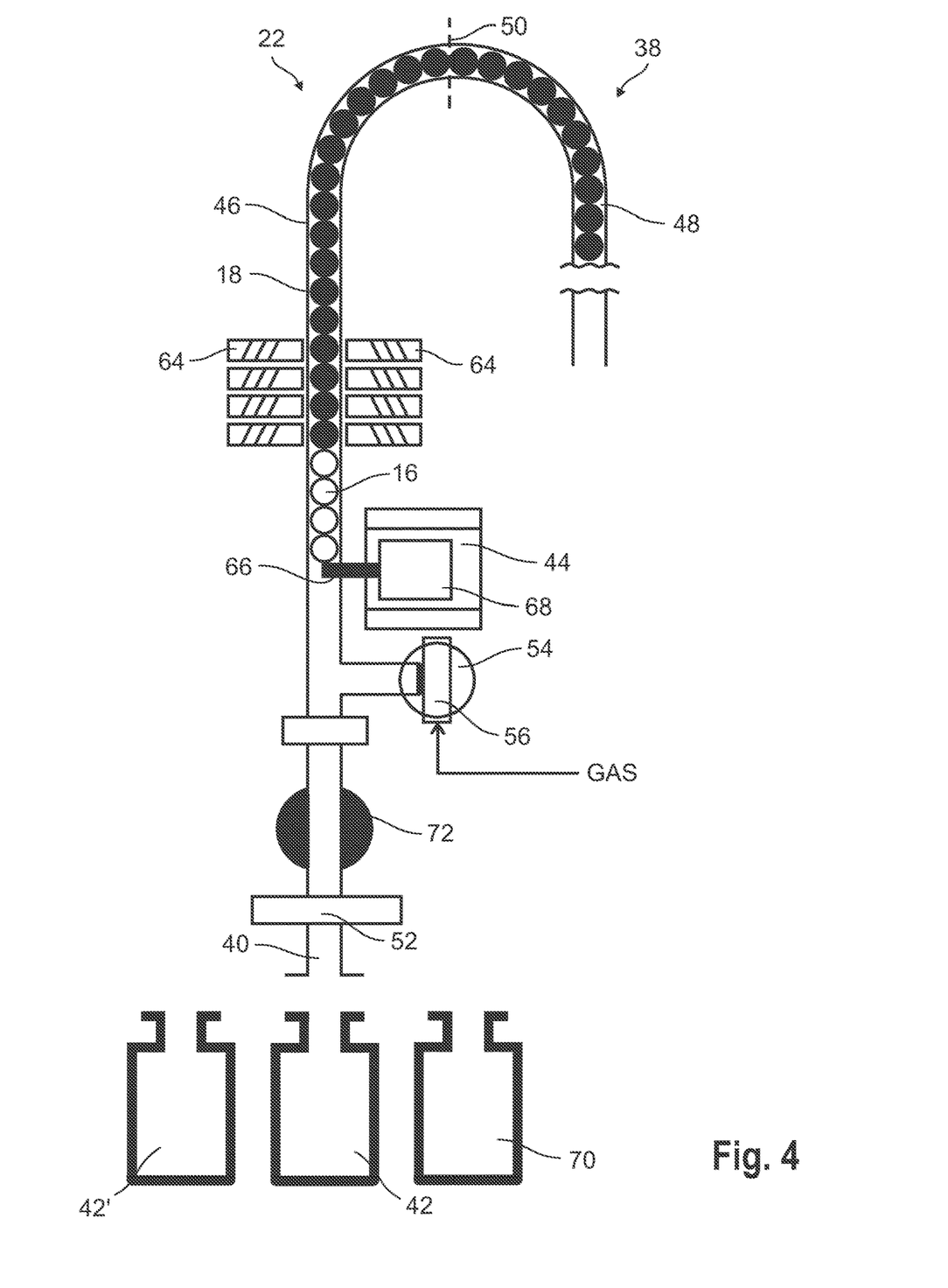
FIG. 4 shows a schematic sketch of a further target harvesting discharge tube.

A further embodiment of the irradiation target harvesting system 22 is schematically shown in FIG. 4. Components of the harvesting system having the same function as in the previous embodiment are indicated with the same reference numerals.

Referring to FIG. 4, the discharge tube 38 is configured to receive the activated irradiation targets 16 and the dummy targets 18 driven out of the instrumentation finger after activation is completed. The linear order of the irradiation targets 16 and the dummy targets 18 is preserved in the discharge tube 38. The irradiation targets 16 and the dummy targets 18 have different magnetic properties. Preferably, the dummy targets 18 are ferromagnetic whereas the irradiation targets 16 are non-magnetic or paramagnetic, or vice versa.

One or more magnets 64 are arranged at the first discharge tube section 46 between the apex and the lock element. Preferably, the one or more magnets 64 are selected from a permanent magnet and a solenoid.

The lock element 44 is actuated magnetically and comprises a pin 66 crossing the first discharge tube section 46 and an electromagnetic coil 68 for operating the pin 66.

The one or more magnets 64 are surrounding the first discharge tube section 46. Preferably, the magnets 64 are movably arranged along a longitudinal axis of the first discharge tube section 46.

The one or more magnets 64 and/or the lock element 44 are remotely controlled by the ICU 24 so that an automatic and fast processing of the irradiation targets 16 and the dummy targets 18 is achieved.

The T-junction 54 near the exit port in the first discharge tube section comprises a gas inlet 56 linked to the target drive system 20 to blow pressurized gas such as air or nitrogen into the discharge tube 38 and/or instrumentation tube system 12 for driving the irradiation targets 16 and/or dummy targets 18 out of the first and/or second discharge tube section to a holding position in the instrumentation tube system 12 or the instrumentation finger 14.

The exit port 40 of the first discharge tube section can be coupled to one or more storage containers 42, 42' and/or an intermediate tank 70 to selectively receive the irradiation targets 16 or dummy targets 18 released from the first discharge tube section 46. The storage containers 42, 42' and/or the intermediate tank 70 may be movable to match with the exit port 40, or the exit port 40 is supported on a pivotable joint 72 to be movable between storage containers 42, 42' and the intermediate tank 70. Alternatively, the exit port 40 may include a gate to selectively direct the irradiation targets 16 or dummy targets 18 to the appropriate containers 42, 42' and tank 70.

The embodiment of the target harvesting system shown in FIG. 4 is useful for portioning the activated irradiation targets 16 in the discharge tube, as described above, and also for separating the activated irradiation targets 16 from dummy targets 18 in the first discharge tube section 46 due to their different magnetic properties. In particular, the dummy targets 18 and/or the irradiation targets 16 can be exposed to a magnetic field to retain either the dummy targets 18 or the irradiation targets 16 in the first discharge tube section 46 and release the other one of the irradiation targets 16 or the dummy targets 18 from the first discharge tube section 46.

For operating the radionuclide generation and target harvesting system, the irradiation targets 16 and the dummy targets 18 are inserted into the instrumentation finger 14 using the target drive system 20, and the irradiation targets 16 are activated by exposure to neutron flux in the nuclear reactor core when in power generating operation to substantially convert the precursor material of the irradiation target into the desired radionuclide.

The dummy targets 18 and the irradiation targets 16 are arranged in the instrumentation finger 14 in a pre-calculated linear order such that the dummy targets 18 hold the irradiation targets 16 at a predetermined axial position in the reactor core. The optimum axial position of the irradiation targets 16 is calculated by the ICU 24 and/or the online core monitoring system 26 and corresponds to a neutron flux density sufficient for completely converting the irradiation targets 16 to the radionuclide during a predetermined period of time. The remaining positions in the instrumentation finger 14 are occupied by the dummy targets 18 which hold the irradiation targets 16 in place.

The irradiation targets 16 are preferably positioned in the center section 34 of the instrumentation finger 14 in the reactor core 10, and the dummy targets 18 are preferably positioned in the end section 32 of the instrumentation finger 14, i. e., in the lower part of the reactor core 10 where the neutron flux density is insufficient for completely activating the irradiation targets 16 (cf. FIG. 3). As shown in FIG. 2, the space above the irradiation targets 16 in the upper section 36 can remain empty.

The irradiation targets 16 are activated in the instrumentation finger 14 for a period of time sufficient for complete conversion of the precursor material of the irradiation targets to the desired radionuclide, as determined by the online core monitoring system 26 and instrumentation and control system 24. The time to achieve complete conversion of the precursor material will depend on the reactor type and status, neutron flux conditions, type of precursor material and various other parameters known to a person skilled in the art, and may range from several hours to days, or until saturation of activity. Complete conversion means a conversion rate of the precursor material providing a radionuclide content suitable for medical or industrial application of the irradiation targets 16.

After activation of the irradiation targets 16 and conversion to the desired radionuclide is completed, the target drive system 20 is operated to force the dummy targets 18 and the activated irradiation targets 16 out of the instrumentation finger 14 into the discharge tube 38 using pressurized gas such as nitrogen or air. The linear order of the dummy targets 18 and the irradiation targets 16 in the instrumentation finger 14 is preserved in the discharge tube 38 so that the irradiation targets 16 are located proximate to the exit port of the discharge tube 38. The dummy targets are at a distal end of the target column in the discharge tube 38 or instrumentation tube system 12.

At this time, the discharge tube 38 is blocked by the lock element 44 providing a stop for the targets 16, 18 and to prevent the activated irradiation targets 16 and dummy targets 18 from leaving the discharge tube.

The valves of the drive system 20 are then closed and the pressure in the instrumentation tube system 12 is relieved.

The irradiation targets 16 entering the discharge tube 38 are passed over the apex 50 formed at the conjunction between the first and second discharge tube section 46, 48.

A pre-defined quantity of the activated irradiation targets 16 is located proximate to the exit port 40 in the first discharge tube section 46. The quantity of the irradiation targets 16 in the first discharge tube section 46 directly corresponds to the length of the first discharge tube section 46 between the lock element 44 and the apex 50.

The exit port 40 of the discharge tube is coupled to a shielded storage container 42, and the lock element 44 is opened so as to release the pre-defined quantity of the activated irradiated targets 16 located on one side of the apex 50 in the first discharge tube section 46 and pass the targets 16 into the storage container 42 under action of gravity. The other quantity of activated irradiation targets 16 and dummy targets 18 located on the other side of the apex 50 in the second discharge tube section 48 is kept in the discharge tube 38, or may flow back into the instrumentation tube system 12, also under action of gravity.

The valve element 52 at the exit port is then closed for providing a pressure-tight sealing of the exit port 40 and the discharge tube 38, and the shielded storage container 42 is removed either manually or by means of an automated handling device.

In a preferred embodiment, the quantity of the activated irradiation targets 16 and dummy targets 18 kept in the second discharge tube section 48 by means of the apex 50 is transferred from the discharge tube 38 into a holding position in the instrumentation tube system 12 prior to removing the storage container 52 from the exit port, as described above with reference to FIG. 3.

The above process steps can then be repeated for portioning and harvesting further quantities of activated irradiation targets 16 from the discharge tube 38. When sensors at the instrumentation tube system 12 indicate the presence of dummy targets 18 and irradiation targets 16 in the first discharge tube section 46, as shown in FIG. 4, the dummy targets 18 and/or the activated irradiation targets 16 are exposed to a magnetic field to retain either the dummy targets 18 or the activated irradiation targets 16 in the first discharge tube section 46 and release the other one of the activated irradiation targets 16 or the dummy targets 18 from the first discharge tube section 46 through the exit port 40 into a storage container 42, 42' or intermediate tank 70.

For separating the irradiation targets 16 from the dummy targets 18 and selectively removing the irradiation targets 16 from the first discharge tube section 46, the solenoids 64 are moved along the longitudinal axis of the first discharge tube section 46 and arranged adjacent to the ferromagnetic dummy targets 18 so that one or more dummy targets 18 proximate to the exit port 40 are associated to and exposed to the magnetic field of a solenoid 64.

The lock element 44 is then opened, and the non-magnetic irradiation targets 16 are released from the first discharge tube section 46 under the action of gravity and passed into the storage container 42, 42' for further processing and/or shipping to an application site. The magnetic dummy targets 18 are kept in the first discharge tube section 46 by the action of the magnetic field generated by the solenoids 64.

After the irradiation targets 16 are separated from the dummy targets 18 and are harvested in the storage container 42, 42', the exit port is coupled to the intermediate tank 70, the magnetic field is switched off and the dummy targets 18 are transferred to the intermediate tank 70 under the action of gravity for further use after a short decay period. The dummy targets 18 kept in the second discharge tube section 48 can be forced out of the discharge tube into the intermediate tank 70 using pressurized gas from the target drive system 20.

Alternatively, some or all of the dummy 18 targets can be driven back into the instrumentation finger 14 by closing the valve element 52 at the exit port 40 and blowing pressurized gas from the target drive system 20 into the gas inlet port 56 at the T-junction 54. A new radionuclide generation cycle can then be started by inserting fresh irradiation targets 16 and/or dummy targets 18 into the instrumentation tube system 12.

According to another embodiment, the irradiation targets 16 in the instrumentation finger 14 may be separated by one or more dummy targets 18 thereby defining irradiation target subsections (not shown). The irradiation targets 16 in the irradiation target subsections can have the same or different material properties.

Also in this embodiment, the activated irradiation targets 16 and dummy targets 18 are driven out of the instrumentation finger 14 into the discharge tube 38 preserving the linear order of the dummy targets 18 and the irradiation targets 16. The first discharge tube section 46 is blocked by the lock element 44 so as to prevent the irradiation targets 16 and dummy targets 18 from leaving the discharge tube 38.

If one or more ferromagnetic dummy targets 18 are now positioned ahead of the irradiation targets 16 proximate the exit port 40, the solenoids 64 are arranged adjacent these dummy targets 18. Pressurized gas from the target drive system 20 is blown into the gas inlet port 56 of the T-junction 54 and used to drive the non-magnetic irradiation targets 16 over the apex 50 back into the second discharge tube section 48 or a holding position in the instrumentation tube system 12. The magnetic dummy targets 18 are retained in the first discharge tube section 46 by means of the activated magnetic field. After the valves of the target drive system 20 are closed, the magnetic field is switched off, the lock element 44 is opened, and the dummy targets 18 are released from the discharge tube 38 under the action of gravity and transferred into the intermediate tank 70 coupled to the exit port 40.

In the next step, the lock element 44 is closed and the irradiation targets 16 and optionally remaining dummy targets 18 are driven out of the instrumentation finger 14 or holding position using pressurized gas from the target drive system 20. The activated irradiation targets 16 are now positioned proximate the lock element 44 and the exit port 40 and can be portioned and/or separated from the dummy targets 18 as described above.

If necessary, the portioning and separation steps can be repeated until all irradiation targets 16 from the various target subsections are selectively harvested from the instrumentation tube system 12 in the multiple storage containers 42, 42'.

It is understood that the target separation and harvesting method of the invention will also be applicable vice-versa if the dummy targets 18 are non-magnetic and the irradiation targets 16 are ferromagnetic.

The radionuclide generation and target harvesting systems according to the invention can also be installed in a nuclear power plant having no conventional aero-ball measuring system. The aero-ball measuring system as described above only provides a basis to facilitate an installation of the radionuclide generation system since no additional instrumentation tubes, fingers and the like need to be installed only for the radionuclide generation. Possible reactor types for such an application include boiling water reactors, heavy water reactors and CANDU (CANada Deuterium Uranium) reactors.

The invention claimed is:

1. An irradiation target harvesting system comprising:
at least one storage container for receiving activated irradiation targets from an instrumentation tube system of a nuclear reactor;
a discharge tube having an exit port configured to be coupled to the storage container; and
a lock element provided in the discharge tube for blocking movement of the activated irradiation targets to the storage container;
wherein the discharge tube comprises a first discharge tube section, a second discharge tube section and an apex formed at a conjunction of the first and second discharge tube sections,
wherein the first and second discharge tube sections are directed downward from the apex,
wherein the exit port is arranged at an end of the first discharge tube section,
wherein the second discharge tube section is coupled to the instrumentation tube system, and
wherein the discharge tube comprises a T-junction located between the lock element and the exit port, wherein the T-junction is configured for supplying and discharging pressurized gas into and out of the discharge tube.

2. The irradiation target harvesting system according to claim 1, wherein the exit port comprises a valve element for pressure-tight sealing the discharge tube.

3. The irradiation target harvesting system according to claim 1, wherein the first discharge tube section, the second discharge tube section and the apex have a shape of an inverse U.

4. The irradiation target harvesting system according to claim 1, wherein the lock element is at a first level, wherein the second discharge tube section has a base point opposite to the apex and the base point is at a second level, and wherein the first level is higher than the second level.

5. The irradiation target harvesting system according to claim 1, wherein the harvesting system comprises one or more magnets arranged at the first discharge tube section between the apex and the lock element.

6. The irradiation target harvesting system according to claim 5, wherein the one or more magnets are selected from a permanent magnet and a solenoid.

7. The irradiation target harvesting system according to claim 1, wherein the lock element comprises a magnetically or mechanically operated restriction element.

8. A radionuclide generation system comprising:
an instrumentation tube system of a nuclear reactor including at least one instrumentation finger extending into a core of the nuclear reactor wherein the instrumentation tube system is configured to permit insertion and removal of irradiation targets into the instrumentation finger;
a target drive system configured to insert the irradiation targets into the instrumentation finger in a predetermined linear order and to remove the irradiation targets from the instrumentation finger;
a core monitoring system and an instrumentation and control unit linked to each other and configured to calculate an optimum axial irradiation position and time for the irradiation targets based on the actual state of the nuclear reactor as provided by the core monitoring system; and
a target harvesting system according to claim 1.

9. The radionuclide generation system according to claim 8, wherein the target drive system is pneumatically operated.

10. The radionuclide generation system according to claim 8, wherein the target harvesting system comprises one or more magnets arranged at the first discharge tube section between the apex and the lock element and the lock element and the one or more magnets are remotely controlled by the instrumentation and control unit.

11. A method for harvesting activated irradiation targets from an instrumentation tube system of a nuclear reactor, wherein the method comprises the steps of:
coupling the instrumentation tube system to a discharge tube having a first discharge tube section, a second discharge tube section and an apex formed at a conjunction of the first and second discharge tube sections, an exit port and a lock element between the apex and the exit port, wherein the first and second discharge tube sections are directed downward from the apex;
passing the activated irradiation targets from the instrumentation tube system into the discharge tube and blocking movement of the activated irradiation targets out of the discharge tube by means of the lock element;
separating a predefined quantity of the activated irradiated targets from another quantity of the activated irradiated targets in the discharge tube;
coupling the exit port to a storage container and releasing the lock element to pass the predefined quantity of the activated irradiated targets under action of gravity into the storage container;
wherein said separating step comprises passing the predefined quantity of the activated irradiation targets over the apex into the first discharge tube section and keeping the other quantity of activated irradiation targets in the second discharge tube section or the instrumentation tube system by means of the apex.

12. The method according to claim 11, further comprising a step wherein the other quantity of the activated irradiation targets separated from the predetermined quantity of activated irradiation targets is transferred from the second discharge tube section into a position in the instrumentation tube system prior to removing the storage container from the exit port.

13. The method according to claim 11, further comprising a step wherein irradiation targets and one or more dummy targets are inserted into the instrumentation tube system, wherein the dummy targets are made of an inert material that is not substantially activated under the conditions in the core of an operating nuclear reactor, and wherein the irradiation targets and the dummy targets have different magnetic properties.

14. The method according to claim 13, wherein the dummy targets inserted into the instrumentation tube system are ferromagnetic, and the irradiation targets inserted into the instrumentation tube system are non-magnetic or paramagnetic.

15. The method according to claim 14, further comprising a step wherein the dummy targets and/or the irradiation targets are exposed to a magnetic field when in the first discharge tube section.

16. The method according to claim 13, further comprising a step wherein the dummy targets and/or the irradiation targets are exposed to a magnetic field when in the first discharge tube section.

17. The method according to claim 13, wherein the irradiation targets are separated from the dummy targets by selectively removing one of the irradiation targets and the dummy targets from the discharge tube, the method further comprising the steps of exposing the irradiation targets or the dummy targets to a magnetic field, opening the lock element, and releasing one of the irradiation targets or the dummy targets from the discharge tube while keeping the other one of the irradiation targets or the dummy targets in the first discharge tube section by the action of the magnetic field.

18. The method according to claim 17, wherein the step of separating the irradiation targets from the dummy targets further comprises driving one of the dummy targets or the irradiation targets back into the instrumentation finger or a holding position in the instrumentation tube system while retaining the other one of the dummy targets or the irradiation targets in the first discharge tube section by means of the magnetic field.

* * * * *